United States Patent [19]

Brandt

[11] 4,050,317
[45] Sept. 27, 1977

[54] CENTRIFUGAL WEIGHTS ORIENTING SYSTEM

[76] Inventor: Arthur V. Brandt, 88 Atlantic Place, Hauppauge, N.Y. 11787

[21] Appl. No.: 511,047

[22] Filed: Oct. 1, 1974

Related U.S. Application Data

[63] Continuation-in-part of Ser. No. 436,748, Jan. 25, 1974, abandoned, and a continuation-in-part of Ser. No. 486,183, July 5, 1974, abandoned.

[51] Int. Cl.² ............................................. F16H 33/02
[52] U.S. Cl. ....................................................... 74/64
[58] Field of Search ........................ 74/84, 64, 61, 5.22

[56] References Cited

U.S. PATENT DOCUMENTS

| | | | |
|---|---|---|---|
| 1,992,457 | 2/1935 | Anderson, Jr. | 74/64 |
| 2,118,430 | 5/1938 | Ellefsen | 74/64 |
| 3,153,353 | 10/1964 | Voigt | 74/5.22 |

Primary Examiner—Samuel Scott
Assistant Examiner—Wesley S. Ratliff, Jr.
Attorney, Agent, or Firm—Chou H. Li

[57] ABSTRACT

The centrifuging weights orienting system comprises: a rotating flywheel provided therein with two centrifuging weights rotatable about a common axis. This axis is anchored at its ends to the flywheel and intersects at right angles with the axis of flywheel rotation. A control means is also provided which is actuated by the flywheel rotation to drive the centrifuging weights into oppositely directed rotations about their common axis. These oppositely directed rotations are synchronized so that at periodic, predetermined time intervals the centrifuging weights are caused to orient toward a common and fixed, prescribed spatial direction.

5 Claims, 10 Drawing Figures

CENTRIFUGAL WEIGHTS ORIENTING SYSTEM

CROSS-REFERENCE TO RELATED APPLICATIONS

This is a continuation-in-part of my pending applications, Ser. Nos. 436,748 and 486,183, filed Jan. 25, 1974 and July 5, 1974, respectively, both now abandoned. These two pending applications are hereby incorporated by reference.

BACKGROUND OF THE INVENTION

This invention relates to methods and apparatus for utilizing centrifugal weights, and more particularly to methods and apparatus for achieving controlled orientations on multiple centrifuging weights rotatably mounted inside a rotating flywheel to achieve controlled mechanical interaction or other effects.

My first pending application, Ser. No. 436,748, filed Jan. 25, 1974 describes a centrifugal weights orienting system which comprises: a flywheel rotating about an axis of rotation; two sliding guides thereon; two weights slidable in the respective guides; and control means for causing the two weights to periodically slide in the two sliding guides during the flywheel rotation and, in particular, to automatically slide into two predetermined positions specifically distant from the axis of rotation at a fixed angular position of the flywheel. Various arrangements, constructions, and controls of the centrifuging weights have also been described therein.

In the invention disclosed in my second copending application, Ser. No. 486,183, filed July 5, 1974, a counterclockwise rotating flywheel is provided with at least two clockwise centrifuging weights disposed spatially relative to each other and rotating about two respective axes normally affixed to the rotating flywheel. A control device is also provided to ensure that the flywheel and the two centrifuging weights are rotating at exactly the same speed and, furthermore, that the two rotating weights are automatically oriented at all times toward a fixed, preset angular direction in space.

While the above-described and incorporated inventions of mine achieve controlled orientation of centrifugal weights, they suffer disadvantages in that the invented machines generally produce heavy vibrations. The vibration problem, however, can be alleviated by having two machines of the same design and quality that are joined together and cycled (180°) oppositely of each other. With this duplex machine structure, the vibrations produced by one machine is exactly balanced or cancelled out by those produced by the other machine. This vibration-cancellation scheme is described in my pending application Ser. No. 486,183, filed July 5, 1974. A new scheme to eliminate this vibration or efficiency problem is an important subject of this invention which is, however, built on, and partly embodies the features given in, these same disclosures already filed in the U.S. Patent Office.

SUMMARY OF THE INVENTION

According to the present invention, a rotating flywheel or rotor is provided therein with two centrifuging weights oppositely rotatable about a common axis. This axis has its ends anchored to the flywheel and intersects at right angles with the axis of the flywheel rotation. A control means is provided which is actuated by the flywheel rotation to drive the centrifuging weights into the oppositely directed rotations about their common axis. These oppositely directed rotations are synchronized so that at periodic, predetermined time intervals the centrifugal weights are automatically oriented in a fixed, prespecified spatial direction.

Thus, one of the objectives of the present invention is to improve the characteristics of mechanical systems embodying therein multiple centrifuging weights;

Another objective of the present invention is to periodically orient two centrifuging weights sometimes toward dimetrically opposite directions and othertimes toward a common and fixed, spatial direction;

Yet another objective is to change the fixed spatial direction even during the operation of the system;

A still further objective is to provide mechanisms to achieve the above-mentioned objectives.

BRIEF DESCRIPTION OF THE DRAWINGS

Other objects and advantages of this invention will further become apparent hereinafter and in the drawings, which show the preferred forms of mechanisms adapted for use in the practice of the invention. The invention is, however, not necessarily limited to the precise arrangements and instrumentarities here shown.

DESCRIPTION OF THE PREFERRED EMBODIMENTS

Figure 1A:
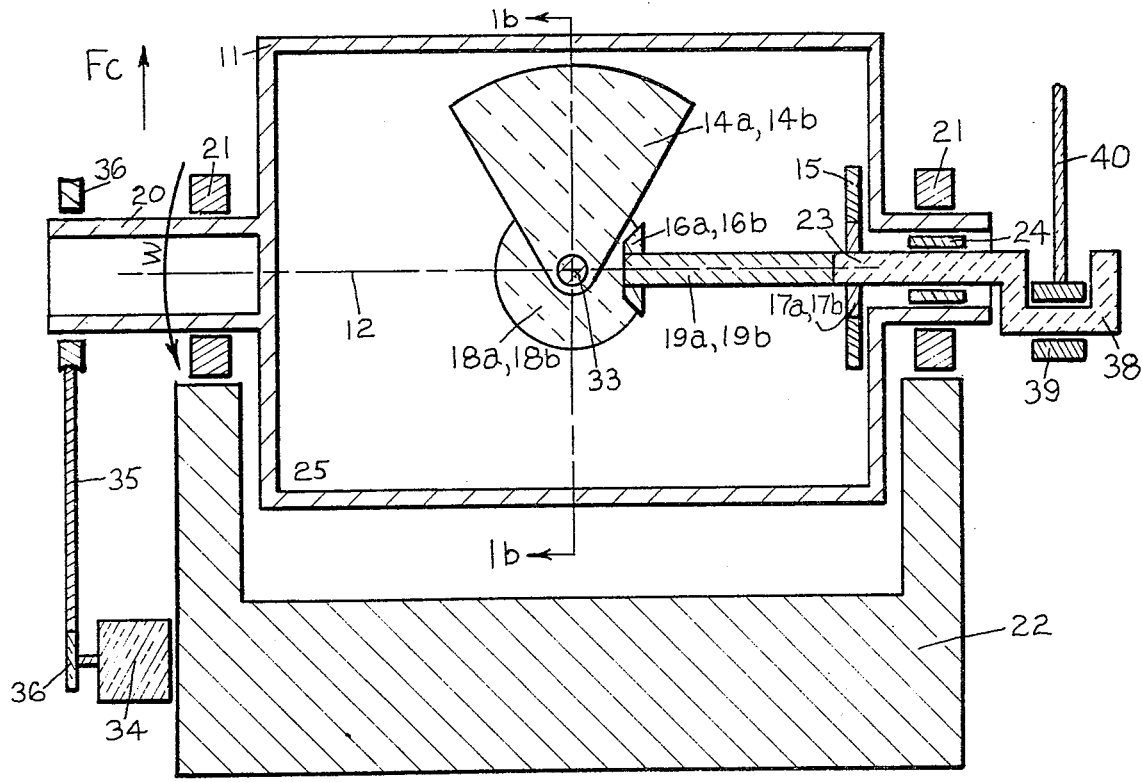
FIGS. 1a–1c are respectively front, side, and top views of a representative form of system or apparatus for use in accordance with this invention.

In describing the preferred embodiments of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

With respect to the specific embodiments of the invention selected for illustration in the drawings, 11 designates generally a horizontal, high-speed flywheel or rotor, which during operation of the system is driven into rotation by the motor 34 with the aid of two pulleys 36 and a coupling belt 35. High-speed rotation is often involved, but the invention is equally applicable to, or can be incorporated onto, many rotating devices or machineries such as cams, flywheels, rotating logs or cylinders, automotive tires, and the like. By high speed is meant in this application any rotational speed in exceed of 20 rpm.

The flywheel 11 has a hollow shaft 20 rotating about axis 12 in the bearings 21 that are supported on the base 22. Inside the hollow shaft 20 is an internal, anchor shaft 23 rotatable in bearings 24, which are supported by the internal surfaces of the hollow shaft 20. The flywheel 11 also has a hollow region 25 in its central portion. Inside this hollow region are provided two centrifuging weights 14a and 14b rotatable in opposite directions (See FIG. 1c) about a common shaft, which is anchored to the flywheel 11. The axis of this common shaft is located at 33 and intersects at right angles with the axis of rotation 12 of the flywheel. The centrifuging weights 14a and 14b are driven into the oppositely directed rotations by a control means actuated or activated by the rotation of the flywheel. This control means comprises the anchor shaft 23; an anchor gear 15 keyed thereto; two driving gears 17a and 17b geared to the anchor gear 15 on opposite sides thereof; two axles 19a and 19b rotatably attached to the flywheel 11 and for mounting the two driving gears 17a and 17b on the outer ends thereof and also for mounting two intermediate gears 16a and 16b on the inner ends thereof; and two driven gears 18a and 18b which are driven by the intermediate gears 16a and 16b and, furthermore, attached through the connecting members 27a and 27b to the centrifuging weights 14a and 14b.

Note that the stationary anchor shaft 23 and the stationary anchor gear 15 can be set, even during the rotation of the flywheel 11, to any fixed angular position, in order to preset the spatial direction toward which the multiple centrifugal weights are is oriented. This direction is vertically upward in all the figures. This setting is achieved by means of a setting control device comprising: a U-shaped crank shaft 38; a sleeve bearing 39 therefor; and a control or connecting rod 40 pivotally connected to the sleeve bearing 39. By pushing or pulling the control rod 40 up or down, with possibly a little twist in the forward or rearward direction at the topmost or bottommost positions, and by holding the control rod 40 in a fixed position after the pushing or pulling, the crank or anchor shaft 23 and anchor gear 15 can be set to any desired angular position, thereby predetermining the angular direction in space toward which the two centrifuging weights are directed or oriented.

An alternate setting control device comprises an aligning disc attached to the anchor shaft 23 and having a number of holes drilled thereon. An aligning pin is to be inserted through a selected hole in the aligning disc for further insertion into an aligning hole in the base 22. This control device is disclosed in my two above-mentioned pending applications.

In the figures, the flywheel rotates counterclockwise at angular velocity w (See FIGS. 1b, 2b, 3b, and 4b). Because of this flywheel rotation, the stationary anchor gear 15 on the stationary anchor shaft 23 causes the gears 17a and 16a, or 17b and 16b, to rotate about their respective horizontal axles 19a or 19b in the same counterclockwise direction (as shown by the rotational arrows on the axles 19a and 19b in FIGS. 1c and 3c), and at exactly the same angular velocity w as the flywheel if the gearing ratios are properly selected. These same gears may, if desired, be rotated at faster or slower rates than the same angular velocity w if other gearing ratios are chosen. The counterclockwise rotation of the intermediate gear 16a causes its matching driven gear 18a (and the attached centrifuging weight 14a) to rotate clockwise, while the same counterclockwise rotation of the intermediate gear 16b causes its matching driven gear 18b (and the attached weight 14b) to rotate counterclockwise, both as viewed from the front side. These directions are also indicated by the arrows on the top sides of the centrifuging weights 14a and 14b in FIGS. 1c and 3c.

Figure 1B:
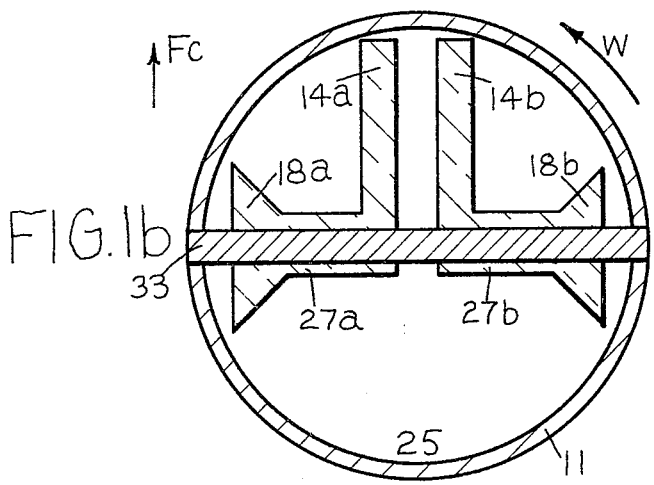

In operation, the flywheel 11 is driven to rotate counterclockwise at angular velocity w (as seen from the right side of FIG. 1a) by the motor 34 through the pulleys 36 and belt 35. The stationary anchor shaft 23 and the anchor gear 15 attached thereto then cause the two driving gears 17a and 17b to rotate both in the counterclockwise direction on the axles 19a and 19b. The intermediate gears 16a and 16b on the same axles then cause the two driven gears 18a and 18b and their attached centrifuging weights 14a and 14b to rotate in opposite directions (See arrows in FIGS. 1c and 3c). At the position shown in FIG. 1a, the fixed angular direction of the anchor shaft 23 is set vertically downward. Because of the initial matching of the gears, the two centrifuging weights 14a and 14b are automatically and periodically oriented toward a fixed direction, as shown in FIGS. 1a and 1b.

Figure 2A:
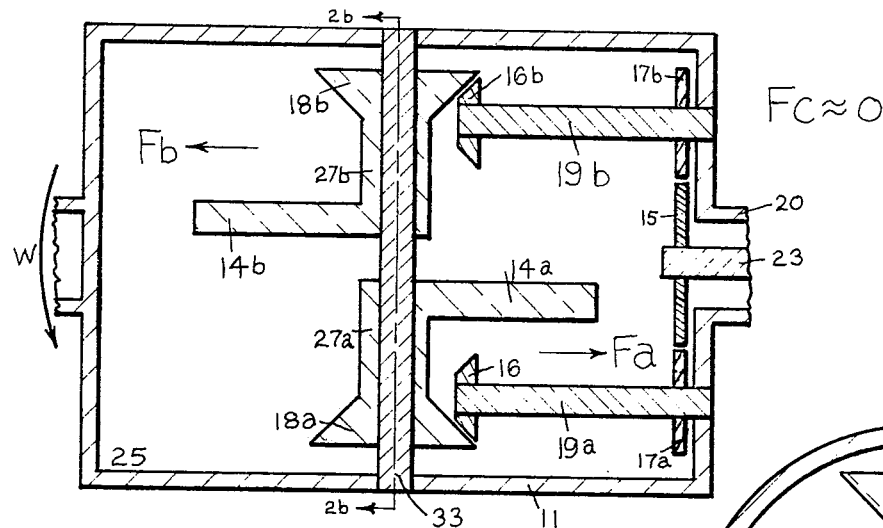
FIGS. 2a–2b are respectively front and side views of the same apparatus after the flywheel has rotated 90° from the position of FIGS. 1a–1c.
Figure 2B:
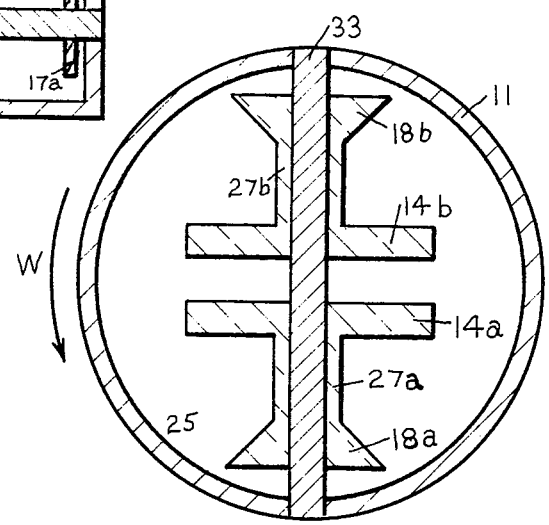

After one quarter (90°) revolution of the flywheel 11, the centrifugal propulsion system assumes the position shown in FIGS. 2a–2b. In this position, the centrifuging weight 14a points to the right (FIG. 2a) while the centrifuging weight 14b points pointing to the left. For the typical case, the driving gear 17a, intermediate gear 16a, and driven gear 18a for the weight 14a are matched in design to the respective gears for the weight 14b, these two weights 14a and 14b thus rotate at exactly the same angular velocity as that of the flywheel 11, i.e., w.

Figure 3A:
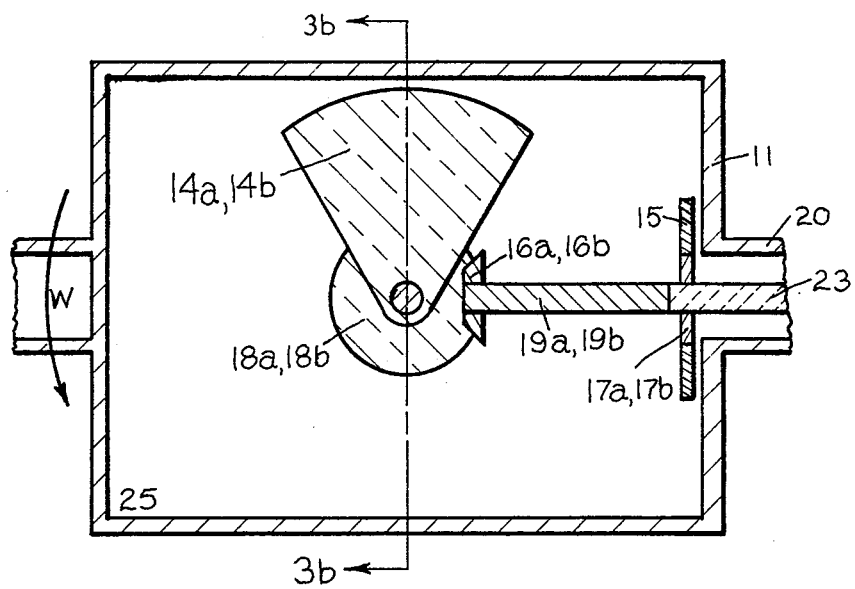
FIGS. 3a–3c are respectively front, side, and top views of the same apparatus after the flywheel has rotated 180° from the position of FIGS. 1a–1c.
Figure 3B:
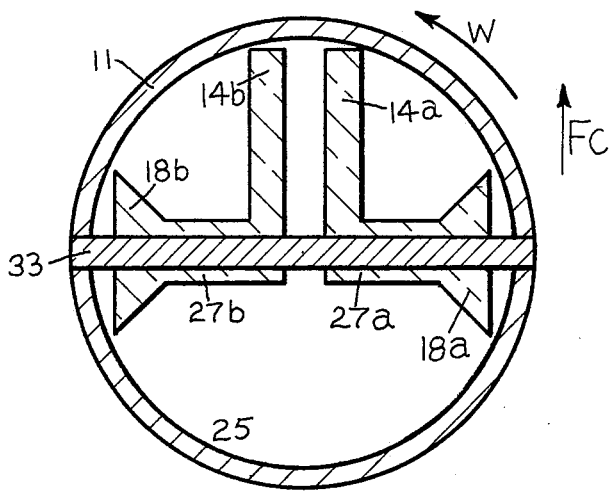
Figure 3C:
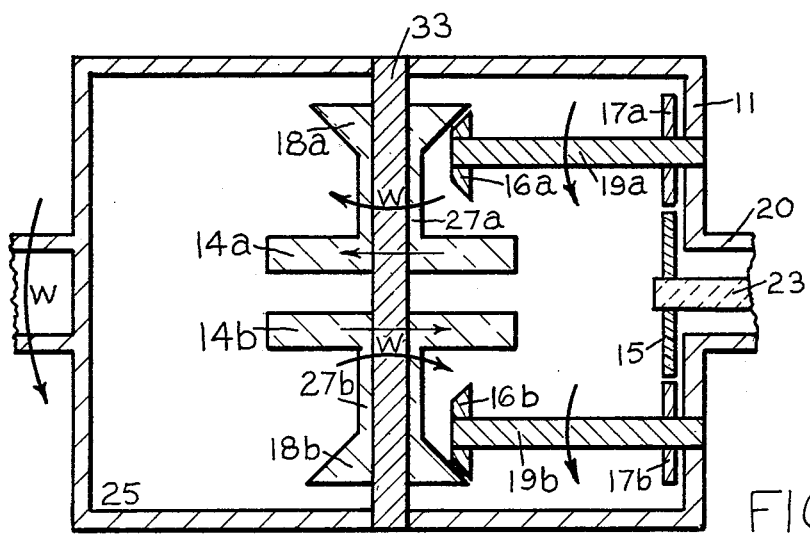

After another one quarter turn of the flywheel 11, the centrifugal weights orienting system assumes the position shown in FIGS. 3a–3c. These figures are very similar to FIGS. 1a–1c, except that the positions of the two centrifuging weights 14a and 14b, with their associated gears, are exactly interchanged.

After still another one quarter revolution of the flywheel 11, the centrifugal propulsion system assumes the position shown in FIGS. 4a–14b. These figures are similar to FIGS. 2a–2b, except again for the interchanging positions of the two centrifuging weights and other associated gears.

Figure 1C:
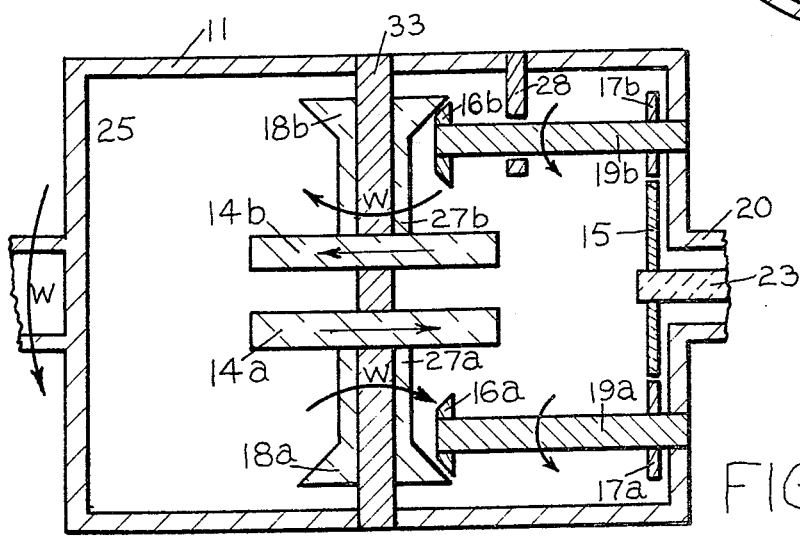

Another one quarter turn of the flywheel 11 brings the centrifugal propulsion system back into the first position shown in FIGS. 1a–1c, thereby completing one full cycle of revolution. In all these figures, the stationary anchor shaft 23 is preset by means of the control rod 40, the bearing 39, and U-shaped crank shaft 38 so that this U-shaped portion is at its lowest possible position. By resetting either this position, or the initial matching conditions of the gears, the angular position of the anchor shaft and, hence, the direction of the two centrifugal weights, can be changed at the will of the operator of the system.

Because the two centrifuging weights are periodically caused to orient, sometimes toward dimentrically opposite directions and othertimes toward a common and fixed, spatial direction, their combined mechanical effects can be caused to vary also cyclically with identically the same period. That is, the two centrifuging weights, instead of randomly rotating in opposite directions on their common axis, are caused to mechanically interact periodically in a completely predictable manner.

Figure 4A:
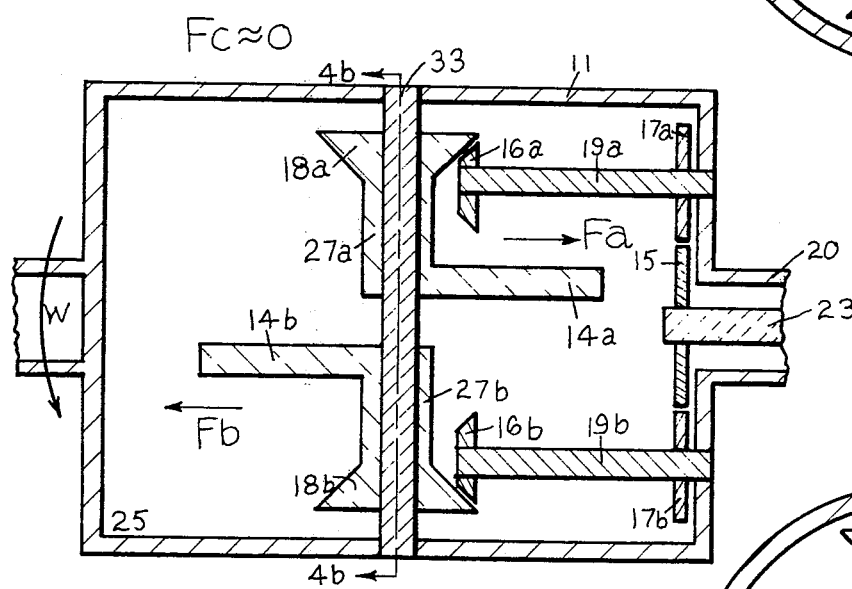
FIGS. 4a–4b are respectively front and side views of the same apparatus after the flywheel has rotated 270° from the position of FIGS. 1a–1c.
Figure 4B:
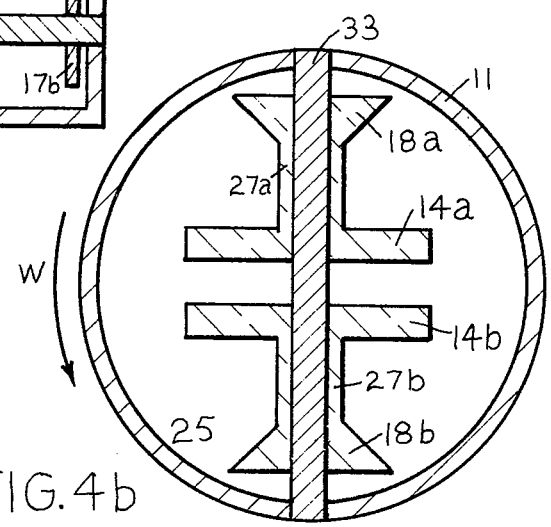

In a most useful mode of operation of the system, the two centrifuging weights 14a and 14b and their associated gears are designed so that the weights rotate with the same angular velocity as the flywheel, i.e., w. During each revolution of the flywheel 11, the two centrifugal weights on this system have the same orientation twice (upwardly directed as shown in FIGS. 1a, 1b, 3a, and 3b), and have the opposite orientation also twice (as shown in FIGS. 2a and 4a). This number of occurrence of the same or opposite orientation in each cycle can even be varied by changing the gearing ratios between the anchor gear 15 and driving gears 17a and 17b, and/or between the intermediate gears 16a and 16b and the driven gears 18a and 18b. By selecting proper gearing ratios, the centrifuging weights 14a and 14b can be rotating at angular velocities of 2w, 3w, 4w, . . . , so that the same or opposite orientations then occurs successively at 0° and 180°, 0°, 120° and 240°, or 0°, 90°, 180°, and 270°, . . . from the vertical upward position as shown in FIG. 1a–1c.

While the present invention has been shown and described in certain preferred forms only, it will be obvious to those skilled in the art that it is not so limited but is susceptible to various changes or substitutions and modifications without departing from the spirit and scope thereof. In other words, the particular forms disclosed herein are to be regarded as illustrative rather than restrictive. Skilled persons will have occasions to practice numerous variations on specific features of the invention. For example, four, six, eight, . . . centrifuging weights may be used with the same flywheel 11, instead of two weights 14a and 14b. It is my desire that all such variations fall within the spirit and scope of the invention as defined by the following claims.

I claim:

1. A centrifuging weights orienting system comprising:
    a rotor mounted about a first axis for rotation at a fixed angular velocity;
    first driving means for driving the rotor to rotate about the first axis;
    two centrifuging weights rotatably mounted about a common, second axis which is anchored at its ends to the rotor and intersects at right angles to the first axis;
    second driving means for driving the two centrifuging weights into oppositely directed rotations about the second axis at substantially the same fixed, angular velocity;
    control means actuated by the rotation of the rotor at activate the second driving means for achieving the oppositely directed rotations;
    said second driving means including a set of two driven gears each fixedly attached to one of the centrifuging weights, and also including means for synchronizing the oppositely directed rotations so that at periodic, predetermined time intervals the centrifuging weights are oriented in a common and fixed, prespecified spatial direction;
    said control means comprising a common driving mechanism mechanically coupled to the driven gears for simultaneously driving these gears and the two attached centrifuging weights thereby achieving the oppositely directed rotations;
    said common driving mechanism comprising a stationary anchor shaft inside the rotor and an anchor gear attached onto the anchor shaft which has an axis of rotation substantially coinciding with the first axis;
    said anchor shaft being adjustable in rotational angular position to thereby define the common and fixed, spatial direction toward which the two centrifuging weights are periodically oriented; and
    means for adjusting the angular position in a predetermined manner.

2. The system of claim 1 wherein the common driving mechanism includes two intermediate gears driven around the anchor gear.

3. The system of claim 2 wherein the common driving mechanism includes two axles for mounting the two respective, intermediate gears at their outer ends; and includes also two driving gears mounted on the respective inner ends of the two axles for driving the two driven gears into the oppositely directed rotations about the common, second axis.

4. The system of claim 3 wherein the axes of the intermediate gears are located on opposite sides of the axis of the anchor shaft in a longitudinal cross-sectional plane of the rotor containing the first axis.

5. The system of claim 4 wherein the axles are parallel to each other and also to the first axis.

* * * * *